United States Patent
Iwai et al.

(10) Patent No.: US 9,777,784 B2
(45) Date of Patent: Oct. 3, 2017

(54) DISK BRAKE ROTOR WITH HOLLOW PORTIONS

(75) Inventors: Toru Iwai, Kitakatsuragi-gun (JP); Makoto Souwa, Tondabayashi (JP)

(73) Assignee: Shimano, Inc., Sakai, Osaka (JP)

( * ) Notice: Subject to any disclaimer, the term of this patent is extended or adjusted under 35 U.S.C. 154(b) by 522 days.

(21) Appl. No.: 13/038,679

(22) Filed: Mar. 2, 2011

(65) Prior Publication Data

US 2012/0222926 A1    Sep. 6, 2012

(51) Int. Cl.
*F16D 65/12*    (2006.01)
*B62L 1/00*    (2006.01)
*F16D 65/02*    (2006.01)

(52) U.S. Cl.
CPC ............ *F16D 65/123* (2013.01); *B62L 1/005* (2013.01); *F16D 2065/1316* (2013.01)

(58) Field of Classification Search
CPC ........... F16D 65/123; F16D 2065/1311; F16D 65/128; F16D 2065/1328; F16D 2065/1316; B62L 1/005
USPC ............. 188/218 XL, 71.6, 18 A, 26, 264 A, 188/264 AA, 264 F, 264 CC, 250 D, 58, 188/114; 301/6.8; D12/180
See application file for complete search history.

(56) References Cited

U.S. PATENT DOCUMENTS

| | | | |
|---|---|---|---|
| 2,745,518 A | 5/1956 | Bachman | |
| 3,651,895 A * | 3/1972 | Whitfield | 188/71.6 |
| 3,709,561 A * | 1/1973 | De Biasse et al. | 301/6.8 |
| 4,286,696 A * | 9/1981 | Szymski et al. | 188/218 A |
| 4,488,761 A * | 12/1984 | Buell | 301/6.8 |
| 4,835,857 A | 6/1989 | Michelotti | |
| 5,190,124 A * | 3/1993 | Haneda | 188/218 XL |
| 6,079,611 A | 6/2000 | Nakamura et al. | |
| 6,336,531 B1 * | 1/2002 | Chou | 188/218 XL |
| 6,672,419 B2 * | 1/2004 | Buell et al. | 180/221 |
| 6,880,683 B1 * | 4/2005 | Miles | 188/218 XL |
| 6,957,726 B2 * | 10/2005 | Gehrs | 188/218 XL |
| 7,789,206 B2 * | 9/2010 | Carminati et al. | 188/218 XL |
| 2005/0006186 A1 | 1/2005 | Iwai et al. | |
| 2006/0037819 A1 | 2/2006 | Takizawa | |
| 2009/0274531 A1 * | 11/2009 | Townson | 410/104 |
| 2011/0089751 A1 | 4/2011 | Saillet | |

FOREIGN PATENT DOCUMENTS

| | | | |
|---|---|---|---|
| DE | 1189877 | * | 3/1965 |
| DE | 102009014879 A1 | | 9/2010 |
| JP | 2007-269192 A | | 10/2007 |
| JP | 2008-001287 A | | 1/2008 |

* cited by examiner

*Primary Examiner* — Thomas J Williams
*Assistant Examiner* — Mariano Sy
(74) *Attorney, Agent, or Firm* — James A. Deland

(57) ABSTRACT

A disc brake rotor apparatus includes an annular inner member for mounting to a hub, an annular outer member concentric with the annular inner member and having opposite braking surfaces, a first intermediate member extending radially outwardly from the annular inner member to the annular outer member, and a second intermediate member extending radially outwardly from the annular inner member to the annular outer member. The first intermediate member is at least partially and axially spaced apart from the second intermediate member and forms a chamber therebetween.

17 Claims, 4 Drawing Sheets

DISK BRAKE ROTOR WITH HOLLOW PORTIONS

BACKGROUND OF THE INVENTION

The present invention is directed to disk brake devices and, more particularly, to a disk brake rotor with hollow portions.

Disk brake assemblies for bicycles and other vehicles are well known. A typical disk brake assembly comprises a brake disk mounted to a disk support member which, in turn, is mounted to a hub that rotates together with the wheel. A caliper is mounted over the edge of the brake disk, wherein the caliper supports first and second brake pads that straddle the brake disk. During operation, the first and second brake pads frictionally contact opposite sides of the brake disk to stop rotation of the brake disk.

Because of the frictional contact between the brake disk and the first and second brake pads, the brake disk can become extremely hot after repeated and strong application of the brake. Such extreme heat can cause warping of the brake disk, glazing of the braking surfaces, and, in the case of hydraulically-operated disk brakes, boiling of the hydraulic fluid. To prevent such undesirable effects, ventilated brake disk assemblies have been proposed. For example, U.S. Pat. No. 6,079,611 discloses a ventilated brake disk wherein a pair of annular plate members that form the braking surfaces are bonded to a corrugated annular spacing member. While the corrugated spacing member provides good ventilation through the resulting radially-oriented open passages, the resulting structure is heavy. As a result, such a ventilated brake disk may not be as desirable for weight-critical applications such as bicycling, where the added rotating weight decreases cycling efficiency.

SUMMARY OF THE INVENTION

The present invention is directed to various features of a disk brake apparatus. In one embodiment, disc brake rotor apparatus includes an annular inner member for mounting to a hub, an annular outer member concentric with the annular inner member and having opposite braking surfaces, a first intermediate member extending radially outwardly from the annular inner member to the annular outer member, and a second intermediate member extending radially outwardly from the annular inner member to the annular outer member. The first intermediate member is at least partially and axially spaced apart from the second intermediate member and forms a chamber therebetween. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
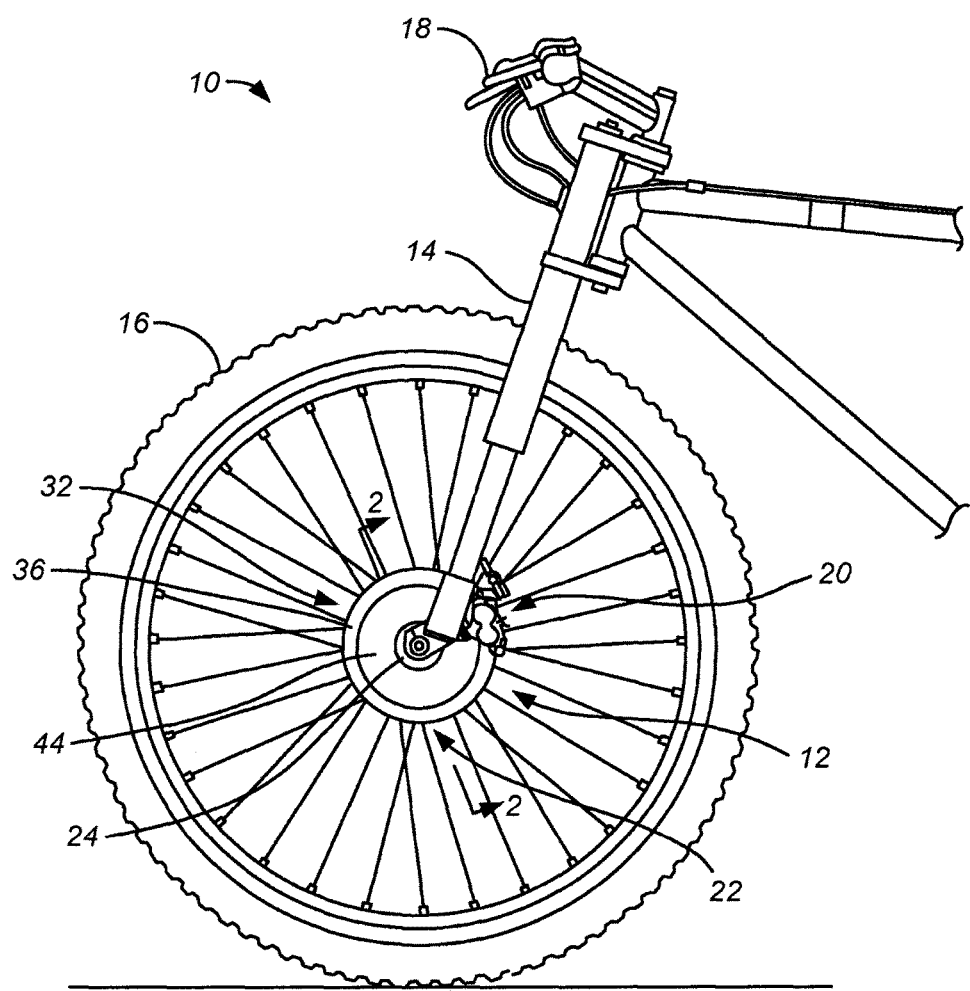
FIG. 1 is a side view of a front portion of a bicycle that employs an embodiment of a disk brake assembly.

FIG. 1 is a side view of a particular embodiment of a bicycle 10. Bicycle 10 includes a disk brake assembly 12 coupled to a front fork 14 for selectively stopping the rotation of a wheel 16. Disk brake assembly 12 includes a brake lever 18, a disk brake caliper 20 operatively coupled to brake lever 18, and a disk brake rotor 22. Disk brake caliper 20 is fixedly coupled to fork 14 of bicycle 10, while disc brake rotor 22 is fixedly coupled to a hub (not shown) of wheel 16 in a well-known manner. Disk brake caliper 20 applies a clamping force to disc brake rotor 22 using first and second brake pads (not shown) in a well-known manner to stop rotation of bicycle wheel 16.

Figure 2:
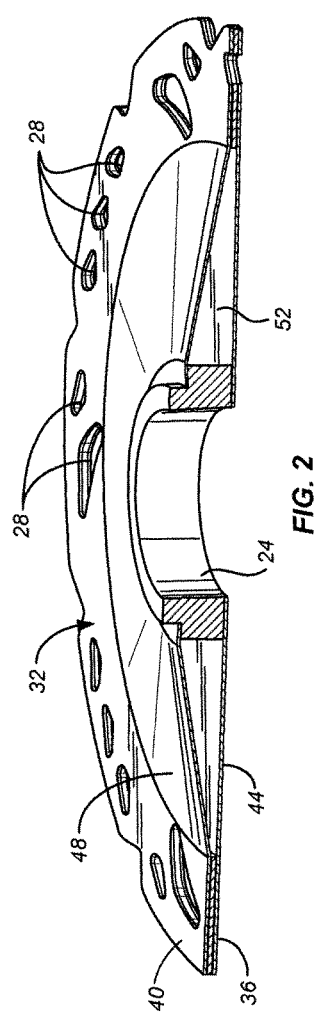
FIG. 2 is a cross-sectional perspective view of a disk brake rotor taken along line 2-2 in FIG. 1.

As shown in FIGS. 1 and 2, rotor 22 comprises an annular inner member 24 for mounting to the wheel hub, an annular outer member 32 concentric with annular inner member 24 and having opposite first and second braking surfaces 36 and 40, a first intermediate member 44 extending radially outwardly from annular inner member 24 to annular outer member 32, and a second intermediate member 48 extending radially outwardly from annular inner member 24 to annular outer member 32. First intermediate member 44 is at least partially and axially spaced apart from second intermediate member 48 to form a chamber 52 therebetween.

In this embodiment, annular inner member 24 is formed as one-piece and comprises a radially inner annular portion 24A and a radially outer annular portion 24B. An axial width W1 of radially inner annular portion 24A is greater than an axial width W2 of radially outer annular portion 24B to maximize mounting contact with the wheel hub while reducing weight. Radially outer portion 24B has no radial openings therethrough.

In this embodiment, annular outer member 32 is a solid member formed as one-piece such that there are no predetermined spaces axially between first and second braking surfaces 36 and 40, subject to manufacturing tolerances. However, if desired, ventilation openings 28 may be formed through annular outer member 32 as shown in FIG. 2 to help cool annular outer member 32 during braking.

Figure 3:
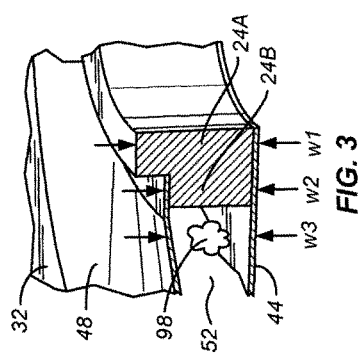
FIG. 3 is a detailed view showing bonding of first and second intermediate members to an annular inner member.
Figure 4:
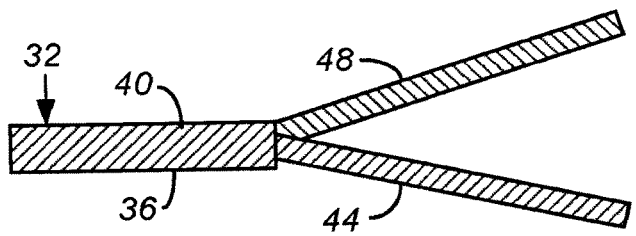
FIG. 4 is a detailed view showing bonding of first and second intermediate members to an annular outer member.

In this embodiment, first intermediate member 44 and second intermediate member 48 are formed as generally annular one-piece disks that are free of openings on the sides thereof. As shown in FIG. 3, the inner peripheral edges of first intermediate member 44 and second intermediate member 48 are bonded to the opposite axial sides of radially outer annular portion 24B of annular inner member 24 by welding or by some other known method such that a junction between radially outer portion 24B of annular inner member 24, first intermediate member 44 and second intermediate member 48 along the entire circumference of radially outer portion 24B of annular inner member 24 is free of openings. Similarly, as shown in FIG. 4, the outer peripheral edges of first intermediate member 44 and second intermediate member 48 are bonded to the inner peripheral edge of annular outer member 32 by welding or by some other known method such that a junction between the inner peripheral surface of annular outer member 32 and the outer portions of first intermediate member 44 and second intermediate member 48 along the entire circumference of annular outer member 32 is free of openings. As a result, an axial width W3 of chamber 52 measured from first intermediate member 44 to second intermediate member 48 decreases progressively from annular inner member 24 to annular outer member 32 as shown in FIG. 2. Furthermore, since annular inner member 24, first intermediate member 44 and second intermediate member 48 are free of openings into chamber 54, chamber 54 is formed as a sealed hollow chamber.

When disk brake rotor 22 is rotating and outer annular member 32 is subjected to frictional forces from the brake shoes such that outer annular member 32 is heated, the heat will migrate to the radially outer portions of first intermediate member 44 and second intermediate member 48. As a result, the air in the radially outer portion of chamber 52 will be heated as well. The cooler, denser air near annular inner member 24 will circulate to the radially outer portion of chamber 52 by centrifugal force, thereby causing the heated air to circulate to the radially inner portion of chamber 52 for additional cooling. Thus, outer annular member 32 can be cooled more efficiently without the added weight of prior art cooling structures.

Figure 5:
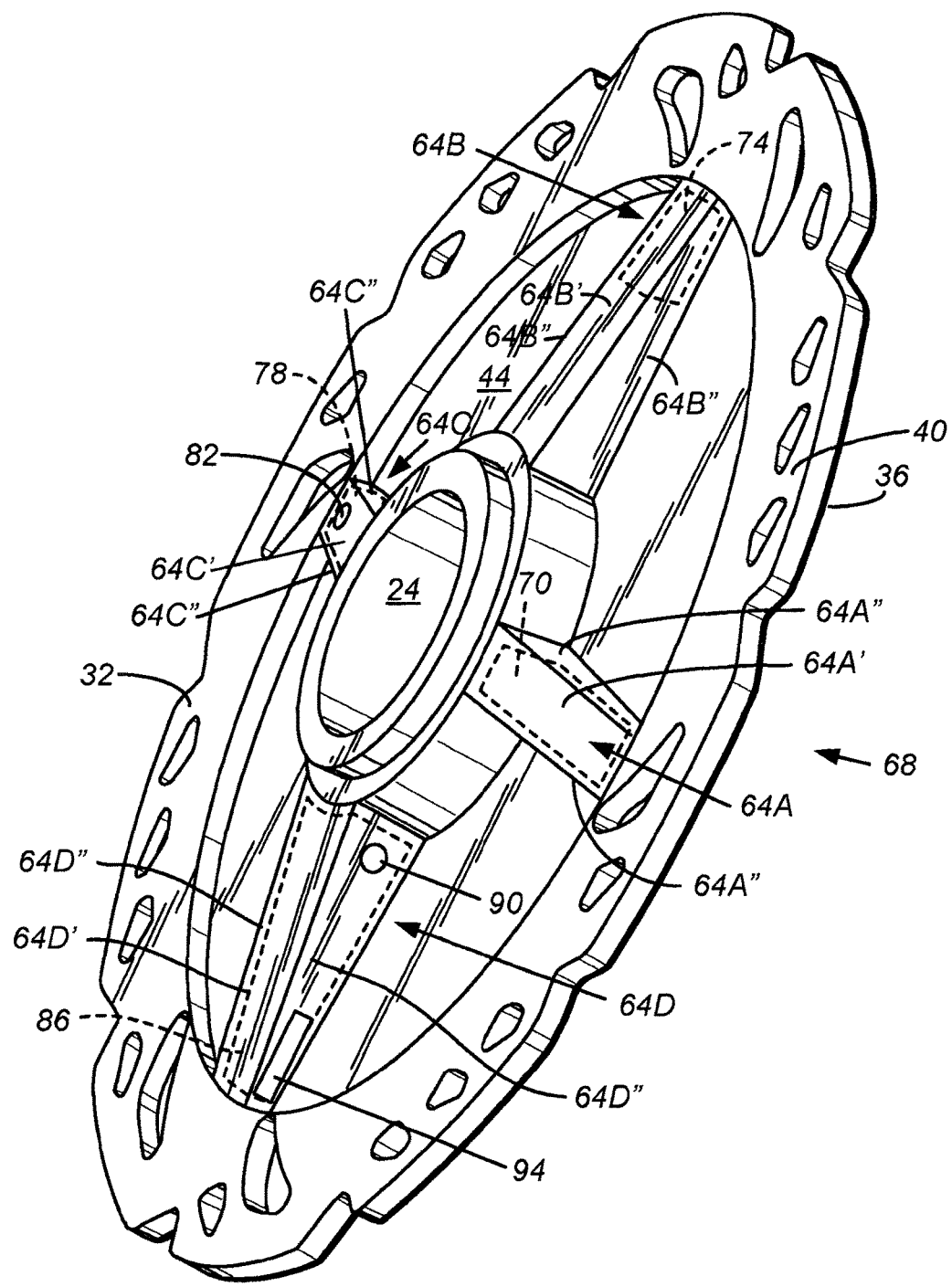
FIG. 5 is a perspective view illustrating alternative embodiments of a disk brake rotor.

FIG. 5 is a perspective view illustrating alternative embodiments implemented in a disk brake rotor 68. As in the first embodiment, disk brake rotor 68 includes annular inner member 24 for mounting to the wheel hub, annular outer member 32 concentric with annular inner member 24 and having opposite first and second braking surfaces 36 and 40, and annular disk-shaped first intermediate member 44 extending radially outwardly from annular inner member 24 to annular outer member 32 and structured in the same manner described above. However, in this embodiment, second intermediate members in the form of arm members 64A-64D are bonded to radially outer portion 24B of annular inner member 24 and extend to the inner peripheral surface of radially outer member 32 where they are bonded thereto.

Arm member 64A includes axial side wall 64A' and circumferential side walls 64A". Axial side wall 64A' is spaced apart from first intermediate member 44, and circumferential side walls 64A" are spaced apart from each other. As a result, axial side wall 64A', circumferential side walls 64A" and first intermediate member 44 define a chamber 70 that extends from annular inner member 24 to annular outer member 32. Axial side wall 64A' and circumferential side walls 64A" are free of openings therein, so chamber 70 is a sealed chamber.

When disk brake rotor 68 is rotating and outer annular member 32 is subjected to frictional forces from the brake shoes such that outer annular member 32 is heated, the heat will migrate to the radially outer portions of first intermediate member 44 and arm member 64A. As a result, the air in the radially outer portion of chamber 70 will be heated as well. The cooler, denser air near annular inner member 24 will circulate to the radially outer portion of chamber 70 by centrifugal force, thereby causing the heated air to circulate to the radially inner portion of chamber 70 for additional cooling. Thus, outer annular member 32 can be cooled more efficiently without the added weight of prior art cooling structures, especially since arm members are used between annular inner member 24 and annular outer member 32.

Arm member 64B includes axial side wall 64B' and circumferential side walls 64B". Unlike arm member 64A, a majority of the radially inner portion of axial side wall 64B' is solid axially to first intermediate member 44. The radially outer portion of axial side wall 64B is spaced apart from first intermediate member 44, and circumferential side walls 64B" likewise are spaced apart from each other. As a result, axial side wall 64B', circumferential side walls 64B" and first intermediate member 44 define a chamber 74 that extends only partially along the radially outer portion of arm member 64B. Axial side wall 64B' and circumferential side walls 64B" are free of openings therein, so chamber 74 is a sealed chamber.

When disk brake rotor 68 is rotating and outer annular member 32 is subjected to frictional forces from the brake shoes such that outer annular member 32 is heated, the heat will migrate to the radially outer portions of first intermediate member 44 and arm member 64B. As a result, the air in the radially outer portion of chamber 74 will be heated as well. The cooler, denser air nearer to annular inner member 24 will circulate to the radially outer portion of chamber 74 by centrifugal force, thereby causing the heated air to circulate to the radially inner portion of chamber 74 for additional cooling. Thus, outer annular member 32 can be cooled more efficiently without the added weight of prior art cooling structures, especially since arm members are used between annular inner member 24 and annular outer member 32. However the cooling effect may not be as efficient as that provided by arm members constructed like arm member 64A.

Arm member 64C includes axial side wall 64C' and circumferential side walls 64C". Axial side wall 64C' is spaced apart from first intermediate member 44, and circumferential side walls 64C" are spaced apart from each other. As a result, axial side wall 64C', circumferential side walls 64C" and first intermediate member 44 define a chamber 78 that extends from annular inner member 24 to annular outer member 32. Unlike arm member 64A, axial side wall 64A' includes an opening 82 into chamber 78. Thus, while chamber 78 is substantially sealed, it is not completely sealed.

When disk brake rotor 68 is rotating and outer annular member 32 is subjected to frictional forces from the brake shoes such that outer annular member 32 is heated, the heat will migrate to the radially outer portions of first intermediate member 44 and arm member 64C. As a result, the air in the radially outer portion of chamber 78 will be heated as well. The cooler, denser air near annular inner member 24 will circulate to the radially outer portion of chamber 78 by centrifugal force, thereby causing the heated air to circulate to the radially inner portion of chamber 78 for additional cooling. Furthermore, opening 82 will allow some transfer of heated air between chamber 78 and the outside environment. Thus, outer annular member 32 can be cooled more efficiently without the added weight of prior art cooling structures, especially since arm members are used between annular inner member 24 and annular outer member 32.

Arm member 64D includes axial side wall 64D' and circumferential side walls 64D". Axial side wall 64D' is spaced apart from first intermediate member 44, and circumferential side walls 64D" are spaced apart from each other. As a result, axial side wall 64D', circumferential side walls 64D" and first intermediate member 44 define a chamber 86 that extends from annular inner member 24 to annular outer member 32. Unlike arm member 64A, one or both circumferential side walls 64D" includes a radially inner circular opening 90 into chamber 86 and a radially outer rectangular opening 94 into chamber 86. In this embodiment, only one circumferential side wall 64D" includes a circular opening 90 and a rectangular opening 94 into chamber 86 as shown. Thus, while chamber 86 is substantially sealed, it is not completely sealed.

When disk brake rotor 68 is rotating and outer annular member 32 is subjected to frictional forces from the brake shoes such that outer annular member 32 is heated, the heat will migrate to the radially outer portions of first intermediate member 44 and arm member 64D. As a result, the air in the radially outer portion of chamber 86 will be heated as well. The cooler, denser air near annular inner member 24 will circulate to the radially outer portion of chamber 86 by centrifugal force, thereby causing the heated air to exit rectangular opening 94, enhanced by the rotation of disk brake rotor 68, with fresh air entering circular opening 90. Thus, outer annular member 32 can be cooled more efficiently without the added weight of prior art cooling structures, especially since arm members are used between annular inner member 24 and annular outer member 32.

Figure 6:
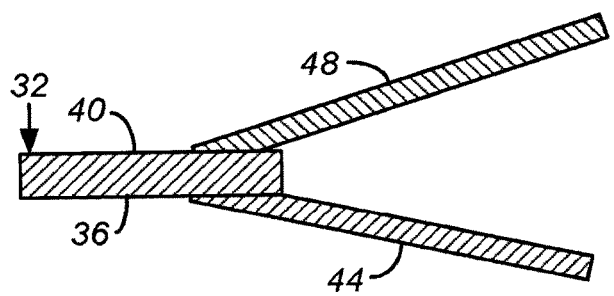
FIG. 6 is a cross-sectional view of an alternative embodiment showing first and second intermediate members bonded to opposite sides of an outer annular member.
Figure 7:
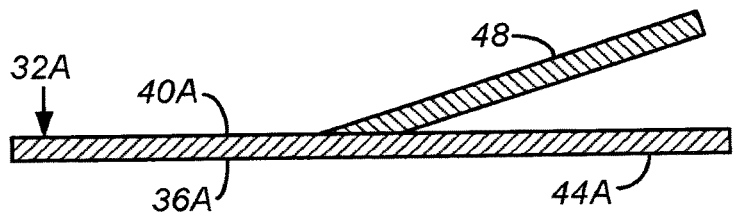
FIG. 7 is a cross-sectional view of an alternative embodiment showing an outer annular member formed as one-piece with an intermediate member.
Figure 8:
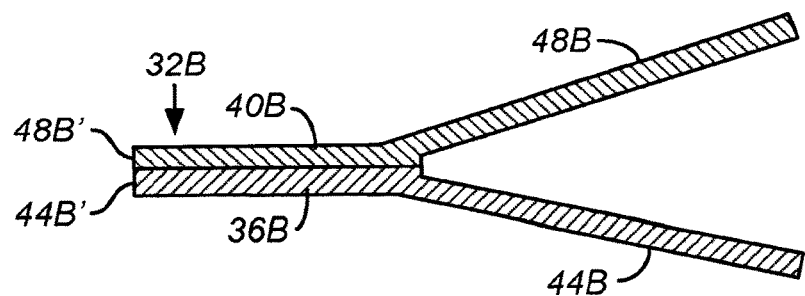
FIG. 8 is a cross-sectional view of an alternative embodiment showing an outer annular member formed as two pieces, wherein each piece is formed as one-piece with an intermediate member.

While the above is a description of various embodiments of inventive features, further modifications may be employed without departing from the spirit and scope of the present invention. For example, while chambers 52, 70, 74, 78 and 86 were hollow air spaces, a solid (e.g., completely solid or granular), liquid or gaseous coolant material 98 could be disposed within the chamber as shown in FIG. 2. While first intermediate member 44 and second intermediate member 48 were bonded to the inner peripheral surface of outer annular member 32 in the first embodiment, first intermediate member 44 and second intermediate member 48 could be bonded to the side surfaces 36 and 40 of outer annular member 32 as shown in FIG. 6. As shown in FIG. 7, a first intermediate member 44A could extend radially outwardly to form an annular outer member 32A with a first braking surface 36A and a second braking surface 40A. As a result, first intermediate member 44 and annular outer member 32A are formed as one piece. As shown in FIG. 8, a first intermediate member 44B could extend radially outwardly to form an annular outer member 44B' with a first braking surface 36B, and a second intermediate member 48B could extend radially outwardly to form an annular outer member 48B' with a second braking surface 40B. Annular outer member 44B' and annular outer member 48B' form a combined outer annular member 32B.

The size, shape, location or orientation of the various components may be changed as desired. The term "annular" is not limited to concentric circles or to other concentric shapes with parallel sides. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. For examples, arms 64A-64D in FIG. 5 could be mixed and matched as desired, including all arms having the same configuration. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A disk brake rotor apparatus comprising:
    an annular inner member for mounting to a hub;
    an annular outer member concentric with the annular inner member and having opposite braking surfaces with at least one opening formed on the opposite braking surfaces;
    a first intermediate member extending radially outwardly from the annular inner member to the annular outer member; and
    a second intermediate member extending radially outwardly from the annular inner member to the annular outer member;
    wherein the apparatus is not structured to mount a tire;
    wherein the first intermediate member is at least partially and axially spaced apart from the second intermediate member and forms a chamber therebetween; and
    wherein at least one of the first and second intermediate members is formed as one continuous piece with the annular outer member.

2. The apparatus according to claim 1 wherein the first intermediate member and the second intermediate member are free of openings that extend through the sides thereof.

3. The apparatus according to claim 1 wherein the chamber is substantially sealed.

4. The apparatus according to claim 1 further comprising a coolant material disposed in the chamber.

5. The apparatus according to claim 1 wherein at least one of the first intermediate member or the second intermediate member is formed as a plurality of radially outwardly extending arms.

6. The apparatus according to claim 1 wherein at least one of the first intermediate member or the second intermediate member is formed as a generally annular disk.

7. The apparatus according to claim 1 wherein a junction between a circumferentially inner portion of the annular outer member and the first intermediate member and the second intermediate member along an entire circumference of the circumferentially inner portion of the annular outer member is free of openings.

8. The apparatus according to claim 1 wherein a junction between a circumferentially outer portion of the annular inner member and the first intermediate member and the second intermediate member along an entire circumference of the circumferentially outer portion of the annular inner member is free of openings.

9. The apparatus according to claim 8 wherein a junction between the circumferentially inner portion of the annular outer member and the first intermediate member and the second intermediate member along the entire circumference of the circumferentially inner portion of the annular outer member is free of openings.

10. The apparatus according to claim 1 wherein the annular outer member measured from the opposite braking surfaces is an axially thinnest part of the apparatus.

11. The apparatus according to claim 1 wherein an axial thickness of the annular outer member measured from the opposite braking surfaces is less than an axial thickness measured from opposite outer surfaces of the first intermediate member and the second intermediate member at a junction of the annular outer member, the first intermediate member, and the second intermediate member.

12. The apparatus according to claim 1 wherein at least one of the first intermediate member or the second intermediate member diverges axially outwardly relative to the braking surfaces of the annular outer member at a junction of the annular outer member, the first intermediate member, and the second intermediate member.

13. The apparatus according to claim 12 wherein both the first intermediate member and the second intermediate member diverge axially outwardly relative to the braking surfaces of the annular outer member at a junction of the annular outer member, the first intermediate member, and the second intermediate member.

14. The apparatus according to claim 1 wherein there are no predetermined spaces axially between the braking surfaces of the annular outer member.

15. A disk brake rotor apparatus comprising:
an annular inner member for mounting to a hub;
at least one annular outer member concentric with the annular inner member and having at least one braking surface with at least one opening formed on the at least one braking surface;
a first intermediate member extending radially outwardly from the annular inner member; and
a second intermediate member extending radially outwardly from the annular inner member;
wherein the apparatus is not structured to mount a tire;
wherein the first intermediate member is at least partially and axially spaced apart from the second intermediate member and forms a chamber therebetween; and
wherein the at least one of the first and second intermediate members and the at least one annular outer member are formed as one piece.

16. The apparatus according to claim 15 wherein the at least one annular outer member includes a first annular outer member and a second annular outer member, wherein the first intermediate member and the first annular outer member are formed as one piece, and wherein the second intermediate member and the second annular outer member are formed as one piece.

17. A disk brake rotor apparatus comprising:
an annular inner member for mounting to a hub;
an annular outer member concentric with the annular inner member and having opposite braking surfaces with at least one opening formed on the opposite braking surfaces;
a first intermediate member extending radially outwardly from the annular inner member to the annular outer member; and
a second intermediate member extending radially outwardly from the annular inner member to the annular outer member;
wherein the first intermediate member is at least partially and axially spaced apart from the second intermediate member and forms a chamber therebetween;
wherein the apparatus is not structured to mount a tire; and
wherein an axial width of the chamber from the first intermediate member to the second intermediate member decreases progressively from the annular inner member to the annular outer member.

* * * * *